United States Patent Office 3,100,706
Patented Aug. 13, 1963

3,100,706
BEVERAGE FROM HONEY AND PROCESS
FOR MAKING IT
Stuart L. Adams, Anchorage, and George V. Niesen, Louisville, Ky., assignors to Joseph E. Seagram & Sons, Inc., New York, N.Y., a corporation of Indiana
No Drawing. Filed Oct. 3, 1960, Ser. No. 59,796
5 Claims. (Cl. 99—29)

The present invention relates to an alcoholic beverage produced from honey and to a process for making it including an improved method of fermenting naturally occurring honey.

Fermentation of various sugars to produce alcoholic beverages has been well known for many years. In such fermentations certain yeasts are employed which exhibit a marked ability to change sugar into alcohol and carbon dioxide. These yeasts are classified as unicellular plants. In common with other forms of living matter they depend for growth upon suitable nutrition, including sources of carbon, nitrogen, hydrogen, oxygen and various minerals such as calcium, phosphorus, sulfur, magnesium and potassium.

Honey, the sweet, viscid liquid elaborated by honeybees from nectar collected by them from flowers, has been fermented since ancient times using various techniques. The undistilled products of these fermentations have been known by various names including mead and hydromel.

Mead however has not gained acceptance as a beverage. Although sweet tasting due to the presence in it of unfermented sugars mead has had a generally undesirable flavor. The poor flavor of mead beverages has been attributed in important part to the excessive period of time necessary for fermentation of the honey to become complete.

Rapid fermentation has occured over only a short initial period following which the rate of fermentation has decreased precipitously. An important cause of this decreased fermentation rate is the fact that the yeast cells have tended to either settle to the bottom or rise to the top surface of the fermentation medium. Such yeast cells have been thus rendered less accessible to the sugars and yeast nutrients present bringing about an appreciable decrease in their rate of growth and metabolism. As a result the fermentation process has had to be continued such a long period of time that some of the yeast cells have ruptured or autolyzed, thereby giving rise to the development of an undesirable flavor in the resulting liquor. This undesirable flavor is derived from the autolysis products themselves as well as from infection by undesirable bacteria which invariably occurs after autolysis.

Prior honey fermentations have thus been unsuccessful, both because of incomplete utilization of the sugars present in the honey and eventual rupture of the yeast cells present resulting in the liberation of unpleasant flavorings. The yeast cells have gravitated to the bottom of the fermenting mix or been lifted to the top surface by rising carbon dioxide gas bubbles formed during fermentation. Fermentation time periods have been required lasting for several weeks and often up to and in excess of one month. The fermentation products so formed have been either unpalatable or so lacking in pleasant taste as to be undesirable. It has been impossible to retain in the fermented products the desired floral fragrances originally present in the natural honey while at the same time avoiding introduction of new and unpleasant flavorings during the fermentation process itself.

It is a primary object of the invention to provide a potable alcoholic beverage which has been distilled from fermented honey, which beverage retains the various floral essences which have been collected into the honey. An allied object is to provide such an alcoholic beverage which includes along with the floral essences from the honey certain congeneric substances of pleasing flavor and essence produced during fermentation by maintaining control over the metabolism of the fermenting yeasts present.

Another and equally important object of the invention is to provide a process for making the beverage which includes an improved honey fermentation method whereby the rate of fermentation is materially increased so that complete or substantially complete fermentation is achieved in a matter of a few days time rather than the many weeks previously required. An ancillary object is to provide a fermentation process in which the fermentable sugars in the honey are virtually completely utilized by the fermenting yeast in less than about ten days' time, thereby preventing rupture of the yeast cells and thus avoiding liberation therefrom of congeners having unpleasant flavors.

A further object is to provide a tasteful and palatable alcoholic beverage obtained by distilling the mixture resulting from the described rapid fermentation of honey. Another object is to provide a new and improved composition of fermented honey which may be distilled to produce as a distillate the alcoholic beverage described herein.

Natural honey as it passes in commerce is the unadulterated product of the honeybee and comprises about 85–90% of various sugars by weight. In some honeys the sugars make up as much as 99% of the solids.

Briefly described, the novel alcoholic beverage is produced by (1) diluting natural honey with water, (2) fortifying the honey in water solution with a suitable yeast nutrient, (3) yeasting the honey-nutrient mixture with any of various known yeasts, (4) incubating the yeasted honey-nutrient mixture to permit fermentation to commence and proceed (5) agitating the fermenting mixture during incubation sufficient to maintain the yeast cells in suspension until fermentation is complete, (6) distilling the resulting fermented mixture, and (7) collecting the distillate which becomes the new alcoholic beverage.

The first step of the process, dilution of the honey, may be carried out in any known manner. Honey as received from the honeycomb is diluted with water such that the resultant sugar content is about 12–18 percent by weight of the total mixture. The honey in water solution is mixed to assure its uniformity.

The exact sugar concentration chosen for the solution will depend upon various factors including the nature of the particular yeast employed and the concentration of alcohol desired as well as the type of honey used. In any event it will be desirable to dilute the honey to an extent such that the mixture or liquor after fermentation will contain about 6–9 percent alcohol by volume. Lower alcohol concentrations will require the use, later, of distilling equipment of greater capacity than would normally be desired. High sugar concentrations during fermentation undesirably slow down the rate of yeast growth and, consequently, the rate of fermentation. Moreover some of the sugar will remain unfermented if the alcohol tolerance of the yeast is reached. In general we prefer to dilute the honey to about 16 percent sugar by weight.

Fortification of the honey in water solution is accomplished by adding the required amounts of nutrient to the mixture and agitating as required to again assure arrival at a uniform mixture. Any of various known nutrient supplements may be used, e.g. certain mineral salts such as those containing nitrogen, potassium, phosphate and magnesium or mixtures thereof.

We prefer to employ certain especially efficacious nutrients, i.e. corn distiller's dried solubles, which are described in detail in our copending application Serial No. 59,795, filed October 3, 1960. Corn distiller's dried solubles are described in definition #83 adopted by the American Feed Control Officials in 1951 as the product obtained in the manufacture of distilled liquors and alcohol from corn, or from a grain mixture in which corn predominates, by condensing and drying the screened stillage obtained therefrom.

Yeasting is accomplished by initially growing cells of the yeast to be used in the chosen nutrient medium and transferring the actively growing yeast into the nutrient containing honey mixture. Various known yeasts may be employed, preferably those chosen from the commonly used wine, beer and whiskey fermentation yeasts. For example certain yeast strains from the groups of *Saccharomyces cerevisiae* and *Saccharomyces carlbergensis* are useful.

Incubating the yeasted honey-nutrient mixture constitutes holding or maintaining the mixture under such conditions that fermentation commences and for a period of time long enough for it to proceed to completion. It is usually preferred to maintain the temperature during fermentation in a fairly narrow range, e.g. 82–86° F.

Agitation of the fermenting mixture during incubation sufficient to maintain the yeast cells in suspension throughout is essential to this invention as described in detail below.

Finally the entire fermented mixture or liquor is heated to its boiling point using any standard distillation equipment, the evolving vapors being condensed and collected as a distillate. The boiling range for the distillate fraction may be selected to give the desired beverage flavor and alcoholic strength. For example a honey product analogous to whiskey or to brandy may be produced in this way if desired.

The present invention is based, in part, on our discovery that agitation of the fermenting mixture to a sufficient degree to keep the yeast cells in suspension throughout the mixture greatly increases the rate of fermentation and thereby avoids autolysis of the yeast cells and the undesirable flavors which result therefrom. More specifically, we have discovered that if the fermenting medium is agitated at the minimum rate required to maintain proliferating and fermenting yeast cells in suspension, the fermentation rate is speeded up sufficiently to accomplish essentially complete conversion by the yeast of the sugar content of the honey into alcohol and carbon dioxide within a period of a few days.

We prefer to provide what may be termed gentle or non-vigorous rather than turbulent agitation, i.e. just enough mixing to keep the yeast cells in suspension in the mixture such that they neither settle to the bottom of the mix nor rise to the top. In this way the yeast cells are maintained in substantially uniform distribution throughout the fermenting mixture and are accessible from all directions to the nutrients and sugars present, thus promoting their growth and metabolism. If vigorous agitation is employed the goals of the present invention are often not achieved inasmuch as undesired breakdown of the yeast cells takes place along with loss of some of the chemical compounds which are believed responsible for the extremely desirable flavor of the final distilled beverage.

Any of the commonly known implements or apparatus for mechanically mixing or agitating mixtures of dispersed solids in a liquid may be employed. Thus flow mixers including recirculators may be used as well as paddle or arm types, propeller or helical mixers and turbine types. Suitable non-mechanical types of mixing schemes may also be used if desired.

The following examples are illustrative of the substantial reduction achieved in the time required for obtaining substantially complete fermentation when the fermenting mixtures are agitated as described herein. In Example I a comparison is given between the rates of honey fermentation obtained when agitation is employed, on the one hand, and without agitation on the other. In both instances the same fermenting yeast and yeast nutrient is employed. Example II demonstrates achievement of the goals of the invention using agitation during fermentation of mixtures containing different fermentation yeasts. Example III shows the result achieved when agitation is coupled with the use as yeast nutrient of corn distiller's dried solubles, which latter is described in detail in our above-mentioned copending patent application.

In all of the examples the rates of fermentation were followed by measurement of the specific gravities of the fermenting mixtures in terms of their Balling degree readings. The Balling degree, named after the German scientist who established it, gives the specific gravity of a fermenting mixture or solution in terms of that of a cane sugar solution consisting of one pound of cane sugar dissolved in enough water to make 100 pounds of solution. It will be understood that the Balling reading does not give the exact percentage of sugar present in a fermenting mix at any given time since it does not directly take into account changes in the specific gravity of the solution resulting from the production therein of alcohol which has a lower specific gravity than water. For example the Balling reading, which is 0 at 0% sugar in a water solution, may be a negative value (less than 0) in an alcohol-water solution in which the sugar or part of it has been consumed by fermentation. Nevertheless, and importantly, the rate of change of the Balling reading with time gives a positive indication of the rate at which fermentation is proceeding.

*Example I*

Yucatan honey was diluted with water to form a solution having sugar content of approximately 16%. To this solution was added aproximately 3.3 percent (based on the undiluted weight of honey) of a mixture of mineral salts comprising approximately 1 part by weight $MgSO_4$, 2 parts by weight $K_2HPO_4$ and 11 parts by weight $(NH_4)_2SO_4$, all of which salts have previously been known and used in these proportions and quantities as nutrients in honey fermentations.

The resulting fortified honey mixture was then divided into two equal portions. Each portion was yeasted with the same strain of the yeast genus Saccharomyces and species *cerevisiae*.

One of the portions was allowed to ferment in the conventional manner, i.e. without agitation. The other portion was agitated gently, i.e. just enough to keep the yeast cells in suspension. Fermentation temperatures were controlled in the range of 82–86° F.

After eight days of fermentation the Balling reading on the unagitated fermenting mixture was 4.0 while the agitated mixture gave a Balling reading of —0.1. As noted above, a Balling reading of near zero, or a negative number, indicates complete or substantially complete conversion of the sugars present to alcohol. It will be understood of course that the original Balling reading of both unfermented mixtures was approximately 15–17 corresponding to the percentage sugar originally present in the diluted solution.

*Example II*

Yucatan honey was diluted and fortified with approximately 3.3 percent mineral salts as described in Example I.

Aliquot portions of the fortified honey mixture were then yeasted with each of five different yeasts, all of which are known to be effective for grain fermentation. The yeasts employed (yeast Nos. 1 through 5 in the table below) were different strains of the genus Saccharomyces, three of them (Nos. 3, 4 and 5) having been of the species *cerevisiae*, one (No. 1) of the species *carlbergensis* and one (No. 2) unidentified as to species.

All of the mixtures were gently but uniformly agitated throughout the fermentation period. The results in terms of Balling readings obtained after the indicated number of days fermentation time are given in the following table.

| Yeast No. | 3.3% Mineral salts nutrient ||
| | Fermentation time (days) | Balling reading (degrees) |
| --- | --- | --- |
| 1 | 8 | 0.4 |
| 2 | 11 | 2.9 |
| 3 | 11 | 0.6 |
| 4 | 7 | 0.4 |
| 5 | 11 | 0.3 |

In from 7–11 days fermentation was complete or substantially complete. Although the fermentation rates were not uniform when different yeasts were employed, it is apparent that agitation during fermentation of each of the mixtures increased the rate of fermentation such that the fermentable sugars had been converted to alcohol in a few days time.

*Example III*

Yucatan honey was diluted with water as in Example I and to this solution was added 5.0 percent (based on the weight of honey before dilution with water) of "corn distiller's dried solubles" as yeast nutrient.

The fortified honey mixture was then yeasted with a strain of the yeast genus Saccharomyces and species *cerevisiae*.

The mixture was agitated gently throughout the fermentation period. As before, fermentation temperatures were controlled in the range of 82–86° F.

After only four days fermentation time the Balling reading had dropped to 0.0 indicating virtually complete conversion of the fermentable sugar present to alcohol.

The fermented liquors from each of the examples, except the unagitated mixture from Example I, were separately distilled and a distillate fraction collected. Each distillate fraction was submitted to an organoleptic evaluation by a panel of taste and odor experts. The beverages were deemed to be of perfect balance and desirable flavor and received the highest ratings by the panel.

The presently preferred embodiments of the invention have been described in some detail in order to enable those skilled in this field to comprehend fully the principles using only the ordinary skills of their specialty. No inference should be drawn, however, from the detailed character of the description that the invention is limited in its employment to any such details of procedure. On the contrary, a wide variety of embodiments are possible, as will readily occur to those skilled in this field and the invention is to cover all methods, alternatives, substitutions and equivalents falling within the spirit and scope of the invention as expressed in the appended claims.

Having thus described our invention, what we claim as novel and desire to protect by Letters Patent is as follows:

1. The process of producing a potable alcoholic beverage which comprises adding water to natural honey to form a solution of about 12 to 18 percent sugar in water, adding yeast cells and yeast nutrient to the solution, non-vigorously agitating the resulting mixture sufficient to maintain the yeast cells in suspension throughout until fermentation of the sugar to alcohol is substantially complete, distilling the resulting fermented natural honey liquor, and collecting the distillate for use as a beverage.

2. The process of producing a potable alcoholic beverage which comprises adding water to natural honey to form a solution of about 12 to 18 percent sugar in water, adding yeast cells and yeast nutrient to the solution, non-vigorously agitating the resulting mixture sufficient to maintain the yeast cells in suspension throughout for not more than about 10 days until fermentation of the sugar to alcohol is substantially complete, distilling the resulting fermented natural honey liquor, and collecting the distillate for use as a beverage.

3. The process of fermenting honey which comprises adding water to natural honey to form a solution of about 12 to 18 percent sugar in water, adding yeast cells and yeast nutrient to the solution, non-vigorously agitating the resulting mixture sufficient to maintain the yeast cells in suspension throughout until fermentation of the sugar to alcohol is substantially complete.

4. The process of fermenting honey which comprises adding water to natural honey to form a solution of about 12 to 18 percent sugar in water, adding yeast cells and yeast nutrient to the solution, non-vigorously agitating the resulting mixture sufficient to maintain the yeast cells in suspension throughout for not more than about 10 days until fermentation of the sugar to alcohol is substantially complete.

5. The process of fermenting honey which comprises adding water to natural honey to form a solution of about 12 to 18 percent sugar in water, adding yeast cells and yeast nutrient to the solution, non-vigorously agitating the resulting mixture sufficient to maintain the yeast cells in suspension throughout until fermentation of the sugar to alcohol is at least partially complete.

References Cited in the file of this patent

UNITED STATES PATENTS

| | | |
| --- | --- | --- |
| 754,461 | Kouba | Mar. 15, 1904 |
| 2,663,667 | Scott | Dec. 22, 1953 |
| 2,676,137 | Schneider | Apr. 20, 1954 |

OTHER REFERENCES

"Chemical Abstracts," vol. 49, 1955, page 11949(a).